Jan. 10, 1967  HANS-JOACHIM BÜLTEMANN  3,296,869
METHOD FOR DETERMINING THE SPECIFIC SURFACE
OF NON-UNIFORMLY SHAPED SUBSTANCES
Filed Nov. 24, 1964
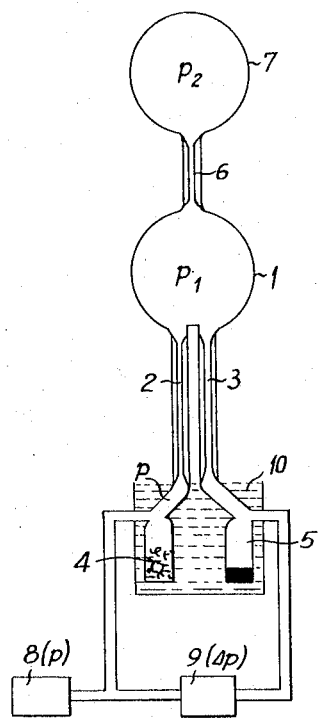
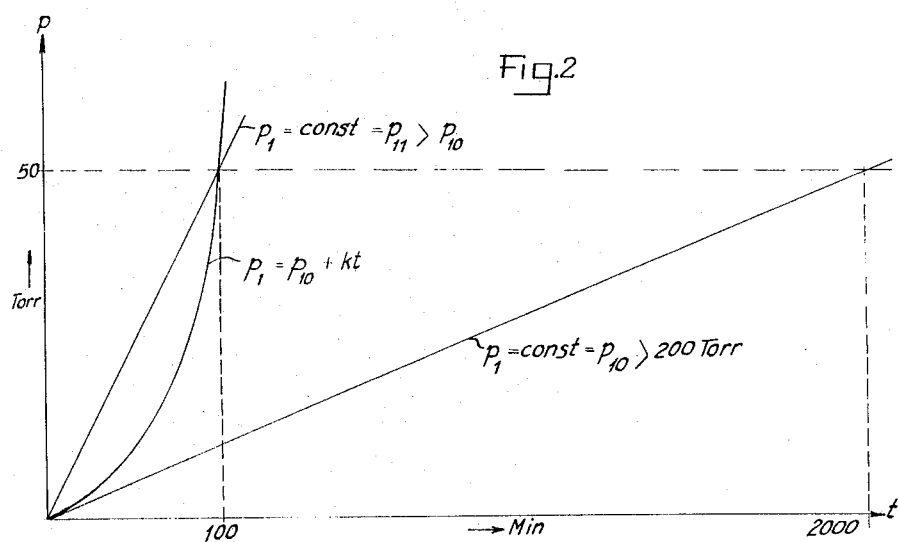
INVENTOR.
HANS-JOACHIM BÜLTEMANN
by
Wolf, Greenfield + Hicken

United States Patent Office 3,296,869
Patented Jan. 10, 1967

3,296,869
METHOD FOR DETERMINING THE SPECIFIC SURFACE OF NON-UNIFORMLY SHAPED SUBSTANCES
Hans-Joachim Bültemann, Schlossparkstrasse 57, Bremen, Germany
Filed Nov. 24, 1964, Ser. No. 413,537
Claims priority, application Germany, Dec. 3, 1963, A 44,696
8 Claims. (Cl. 73—432)

The invention relates to a method for determining the specific surface of non-uniformly shaped substances by measurement of the adsorption of noble gases or inert gases at the specimen to be investigated, in which the gas is fed from a gas supply container into a measuring vessel containing the specimen, the adsorption isotherms dependent on the specific surface being determined by gas pressure measurement for obtaining the so-called BET line. The measurement may be effected with simultaneous passage of the gas through a second flow throttle into a comparison vessel, in accordance with the method disclosed in German patent specification No. 1,057,798.

In the method disclosed in the said patent specification, a gas serving for measurement of the adsorption, for example argon, is admitted to the measuring vessel containing the specimen and also to a comparison vessel which contains filling bodies of small surface for volumetric compensation, the gas quantity flowing into the two vessels, that is to say the so called inflow rate, being kept constant and independent of the pressure in the vessels. This independence of the inflow rate on the counter pressure in the vessels is achieved by using long capillaries, the inlet pressure, that is to say the pressure in front of the two inlet throttles being selected to be at least four times as great as the maximum occurring counter pressure in the comparison vessel. The inflow rate is given by the conductance of the inlet throttles, determined by the length and diameter of the capillaries, and by the inlet pressure in the supply container, and is proportional to the square of the inlet pressure.

This known method has disadvantages both from the operational and structural viewpoint. The inflow rate has to be adapted to the speed at which the adsorption equivalent is set in the test vessel. With many substances it has to be very low, since the adsorption equivalent is set slowly, the measuring gas requiring a long time either to penetrate between the intergranular spaces in fine grained substances or into the pores of porous substances. This time is the greatest at low pressures, since diffusion procedures predominate in this case, which, as known, take place essentially slower than flow procedures.

Accordingly, for the known method, the inflow rate has to be adapted to the adsorption equivalent setting at low pressures. This means that an unnecessarily long time is required for the measurement, since during the measurement the pressure in the test vessel increases, an acceleration of the equivalent setting being connected therewith, which would enable a corresponding increase in the inflow rate.

It is an object of the invention to provide a method for determining the specific surface of non-uniformly shaped substances by measurement of the adsorption of noble or inert gases, which can be performed faster than the above described known method. It is a further object to provide such a method in which the gas is fed from a gas supply container through an inlet flow valve into a measuring vessel containing the specimen, the inlet pressure, that is to say the pressure in the supply container in front of the inlet flow valve, being increased during the measurement, the inflow rate being adapted to the increasing speed of setting of the equivalent adsorption in the measuring vessel. In this manner, the required measuring time can be reduced to a fraction of its otherwise necessary value.

The inflow rate can be influenced in the desired sense, by increasing the conductance of the inlet throttle during the measurement. The increasing of the inlet pressure and/or the inlet conductance can take place continuously, for example according to a linear function.

An especially simple and reliable manner of measurement, insofar as the technique of the method is concerned, is enabled if the inlet pressure is increased by gas reinforcement from a reinforcement container, with a reinforcement rate which is greater than the inflow rate. Accordingly, the advantageous possibility arises of controlling the measured speed in dependence on the characteristics of the specimen in question, by setting the pressure in the reinforcement container. For performing such a method, in addition to the supply container which is disposed in front of the inlet throttle, a second supply container serving as reinforcement container is provided, its pressure being higher than the pressure in the supply container disposed in front of the inlet valve.

The above and other objects and advantages of the invention will be clear from the following description taken with reference to the accompanying drawings which are given by way of example and in which:

FIG. 1 diagrammatically illustrates a measuring apparatus according to the present invention; and FIG. 2 shows an associated pressure diagram.

The measuring apparatus illustrated in FIG. 1 comprises a gas supply container 1 which is connected through two capillary tubes 2 and 3 with measuring vessels 4 and 5. The supply container 1 contains the gas to be adsorbed, for example argon, and is connected through a further capillary 6 with a second supply container 7 for the gas to be adsorbed. An arrangement 8 for continuously measuring the absolute pressure $p$ in the test vessel is connected to the measuring vessel 4 in which the specimen to be investigated is disposed. Furthermore, a measuring arrangement 9 for measuring the pressure difference $p$ between the vessel 4 and the second measuring vessel 5 is provided. The second measuring vessel 5 contains filling bodies of small surface, for example glass balls, the total volume of which equals the volume of the specimen to be investigated, for example a specimen of activated charcoal, in the test vessel 4. The test vessel 4 and the comparison vessel 5 are immersed in a common cooling bath 10, for example of liquid nitrogen, with a temperature of 77° K. at which the adsorption of the specimen is to be measured.

The pressure measurement can be effected in various known manners, for example by an ionisation manometer with ionisation and ion current measurement.

The described arrangement operates as follows: the inflow rate from the supply container 1 with the gas pressure $p_1$ into the test vessel 4 and the comparison vessel 5 is so small that noticeable alterations of the pressure $p_1$ are not caused. Likewise, the inflow rate from the reinforcement container 7 with the pressure $p_2$ through the reinforcement capillary 6 into the supply container 1 is so small that there is no noticeable influence on the pressure $p_2$. On the other hand the inflow rate is so great that the pressure $p_1$ in the supply container continuously increases from a minimum value $p_{10}$ during the measurement.

For the pressure in the test vessel 4, the following relation applies:

$$p = c_1 \cdot 1 \cdot_1{}^2 \qquad (1)$$

In the above equation the symbol $c_1$ is a constant determined by a calibration measurement, $p_1$ is the pressure in the supply container 1 and the symbol $t$ is the time measurement.

This law of pressure increase is true independent of the counter pressure $p$, so long as $p_1$ is greater than $4p$.

For the inflow rate into the test vessel 4, which has the volume V, the following relation applies:

$$V \cdot \frac{dp}{dt} = V \cdot \dot{p} = V \cdot c_1 \cdot p_1^2 = \text{constant for } p_1 = \text{constant} \quad (1a)$$

For $p_1$=constant, an inflow rate which remains constant is accordingly given. The pressure $p_1$ in the supply container 1 with the volume $V_1$ increases however from its initial value $p_{10}$ in a manner which is linear with time, as a result of the reinforcement from the reinforcement container 7 through the reinforcement throttle 6. For this time-dependent pressure in the supply container 1, the following relation holds where $c_2$ is a constant determined by a calibration measurement and $p_{10}$ is the pressure in the supply container 1 at the beginning of measurement:

$$p_1 = p_{10} + c_2 p_2^2 \cdot t \quad (2)$$

This rule for the pressure increase is independent of the counter pressure $p_1$, so long as $p_2$ is greater than $4p_1$.

The inflow rate through the reinforcement throttle 6 is determined by the equation:

$$V_1 \cdot \frac{dp_1}{dt} = V_1 \cdot \dot{p}_1 = V_1 \cdot c_2 \cdot p_2^2 \quad (2a)$$

By combination of equations 1 and 2 one obtains:

$$p = c_1 \cdot t \cdot p_{10}^2 \left[ 1 + c_2 \left( \frac{p_2^2}{p_{10}} \right) \cdot t \right]^2 \quad (3a)$$

or, expressed in terms of the inflow rates, if the pressure increase rate in the supply container 1 at the beginning, with time $t=0$ is designated by $C_1 \cdot p_{10}^2 = (\dot{p})_{10}$ and if $C_2 \cdot p_2^2 = \dot{p}_1$, then $$p = (\dot{p})_{10} \cdot t \cdot \left[ 1 + \frac{\dot{p}_1}{p_{10}} \cdot t \right]^2 \quad (2b)$$

The pressure increase in the measuring vessel 4 follows a parabola, as represented in FIG. 2, for the parameter $p_1 = p_{10} + k \cdot t$, $k$ being proportional to the product of the square of the constant pressure $p_2$ and a constant $c_2$ (see Equation 2 which is dependent on the flow resistance of the reinforcement throttle 6).

The measurement is effected in the usual manner in a pressure range from approximately 0 up to a maximum pressure of about 50 torrs in the test vessel 4. If, as hitherto usual, it were desired to work with a constant inflow rate into the test vessel, then this inflow rate would have to be adapted to the equivalent setting at the low starting off pressure, and as a result of this the pressure in the test vessel would follow the line which is tangential to the parabola, with the parameter $p_1 = \text{constant} = p_{10} > 200$ torrs. The inflow throttle should then be provided with a correspondingly high flow resistance or with a low conductance. As can be seen from FIG. 2 in which $p_{11}$ is a constant which corresponds to the pressure in the supply container 1, measurement in accordance with the known procedures requires a many times longer time, of about 2000 minutes, compared to 100 minutes according to the parabolic increase function. In order to achieve the pressure of 50 torrs in the same rapid time with linear pressure increase, as will be seen from the line with the parameter $$p_1 = \text{constant} = p_{11} (p_{11} > p_{10})$$

a correspondingly high inflow rate must be used from the beginning, but this is not however permissible since it is not adapted to the equivalent setting with the low pressure in the test vessel, and would lead to large measuring errors.

Measuring values of the parabolic increase according to FIG. 2 are given in the following table. The pressure increase in the supply container here amounts to $\dot{p}_1 = 2$ torrs per minute and the pressure in the test vessel follows the equation $$p = 2.5 \cdot 10^{-2} \cdot t [1 + 4 \cdot 10^{-2} \cdot t]^2$$

| $t$ min. | $p$ Torr | $p^1$ Torr | $\frac{p_1}{p}$ |
|---|---|---|---|
| 10 | 0.49 | 70 | 142 |
| 20 | 1.62 | 90 | 55 |
| 50 | 11.3 | 150 | 13 |
| 70 | 35.2 | 210 | 6.0 |
| 90 | 47.6 | 230 | 4.8 |
| 100 | 62.5 | 250 | 4.0 |

In this measurement, the condition $$\frac{p_1}{p} > 4$$

remains satisfied.

The method according to the invention has also the essential advantage that it can be commenced with very low pressures and inlet rates, and nevertheless the measurement can be brought to an end considerably faster than hitherto. In the known method with linear pressure increase in the test vessel, the disadvantage exists that the condition $p_{10} > 4p$, which has to be fulfilled, since the inflow rate remains independent of the counter pressure, under the present relationships ($p$ max.=50 torrs) limits the minimum allowable inlet pressure $p_{10}$ to 200 torrs. For achieving low inflow rates, since the inlet pressure is limited in the downward direction, very narrow and long capillaries are required. These again limit the range of the larger inflow rates, since the inlet pressure is limited in practice by the strength of the supply container. Moreover, with very narrow capillaries the danger exists that they can be blocked by foreign bodies.

With the method according to the invention it is possible to work with starting inlet pressures lying essentially below 200 torrs. This starting inlet pressure, the starting inflow rate (which is determined at a given starting inlet pressure by the capillary dimensions) and the speed of increase of the inlet pressure have simply to be matched to each other so that for the entire measuring time the requirement that the inlet pressure is greater than four times the pressure in the comparison vessel is satisfied.

Many variations are possible within the frame of the invention. Thus, a continuous function instead of a stepped function may be utilised. With a step-like increase of the pressure $p_1$ in the supply container 1, the pressure increase in the test vessel then follows a curve which is composed of straight sections and which can approximate the parabolic form. Furthermore it is possible to increase the inflow rate by increasing the conductance of the inlet throttle during the measurement, in that for example the inlet throttle itself is controlled in its resistance value or a plurality of alternative inlet throttles with an appropriate switching over arrangement are provided. Both means, the increasing of the inlet pressure and the increasing of the inlet conductance may be used separately or in combination.

Furthermore, it is alternatively possible to work, not according to the known method disclosed in German patent specification No. 1,057,798 with a test vessel and a comparison vessel, but instead to introduce into a single test vessel a gas mixture from the supply container, which consists of two components, that is to say a measuring gas, for example argon and a comparison gas, for example helium, and to measure the partial pressures of the two components and to use these for obtaining the adsorption isotherms which determine the BET line.

I claim:

1. A method for determining the specific surface of non-uniformly shaped substances by measuring the adsorption of noble gases or inert gases at the specimen to be investigated, said method comprising, feeding a gas from a gas supply container through an inlet in the form of a flow throttle into a measuring vessel containing the specimen, and during measuring time increasing but not decreasing the gas inflow rate from the supply container to the measuring vessel, and determining the adsorption isotherms which are dependent on the specific surface by gas pressure measurement for obtaining the so called BET line in the measuring vessel.

2. A method as defined in claim 1, wherein the gas is also fed through a second flow throttle into a comparison vessel, the pressure in front of the second flow throttle also being increased and not decreased during the measurement.

3. A method as defined in claim 1, wherein the increasing of the gas inflow rate is effected continuously.

4. A method as defined in claim 1, wherein the increasing of the gas inflow rate is effected according to a linear function.

5. A method as defined in claim 1, wherein the gas inflow rate is increased by gas reinforcement from a reinforcement container, with a reinforcement rate which is greater than the gas inlet rate.

6. A method as defined in claim 5, wherein the measuring speed is controlled by adjusting the pressure in the reinforcement container.

7. A method in accordance with the method of claim 1 wherein said gas inflow rate is increased by increasing gas pressure in the supply container in front of said inlet flow throttle.

8. A method in accordance with the method of claim 1 wherein said gas inflow rate is increased by increasing the conductance of said flow throttle.

References Cited by the Examiner

UNITED STATES PATENTS

| | | | |
|---|---|---|---|
| 2,633,015 | 3/1953 | Morris | 73—38 |
| 3,203,252 | 8/1965 | Polinski et al. | 73—432 |
| 3,211,007 | 10/1965 | Atkins | 73—432 |

FOREIGN PATENTS 1,057,798  5/1959  Germany.

OTHER REFERENCES

Chemie Ing. Techn., vol. 35, No. 8, 1963, Haul et al., pages 586–589.

DAVID SCHONBERG, *Primary Examiner.*